3,275,701
SUBSTITUTED BENZENES
Ernst T. Theimer, Rumson, and Seymour Lemberg, Elizabeth, N.J., assignors to International Flavors & Fragrances, Inc., New York, N.Y., a corporation of New York
No Drawing. Filed Sept. 9, 1963, Ser. No. 307,327
15 Claims. (Cl. 260—668)

This invention relates to processes for producing 1,1-dimethyl-6-tert-butyl indane; intermediates therefor and processes for making such intermediates.

It is an object of this invention to provide simple and efficient methods for the production of the compounds mentioned.

The invention comprises the novel products as well as the novel processes and steps of processes according to which such products are manufactured, the specific embodiments of which are described hereinafter by way of example and in accordance with which we now prefer to practice the invention.

The compound 1,1-dimethyl-6-tert-butyl indane is useful for the preparation of musk-type compounds such as 4-acetyl-1,1-dimethyl-6-tert-butyl indane and its formyl and propionyl analogs in accordance with U.S. Patent No. 2,889,367. This patent describes the preparation of the musk-like compounds by acylation of the above compound, 1,1-dimethyl-6-tert-butyl indane with acyl halides and anhydrides in the presence of catalytic amounts of Friedel-Crafts type catalysts, such as sulfuric, phosphoric or polyphosphoric acids or salts such as aluminum chloride or boron trifluoride.

The process for making the indane of our invention is a three-step process. In the first step an alkali metal phenyl, preferably sodium phenyl is reacted with p-tert-butyl-toluene to form, for example, the novel intermediate compound α-p-tert-butyl benzyl sodium. Such alkali metal compounds may be represented by the following formula, in which M is an alkali metal:

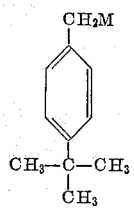

The metal phenyl may be prepared in situ by reaction of the metal with a halobenzene.

In the next step of the process the compound thus prepared is reacted with a methallyl halide to produce the novel intermediate compound 2-methyl-4-(p-tert-butyl-phenyl)-but-1-ene.

In the third step, the thus prepared compound is cyclized to produce the final product, i.e., 1,1-dimethyl-6-tert-butyl indane.

The formation of the α-p-tert-butyl benzyl alkali compound is a cross metalation reaction between the alkali metal phenyl and p-tert-butyl toluene. The reaction proceeds by first forming the alkali metal phenyl by reaction between, for example, metallic sodium or potassium and a halobenzene. This compound, in turn, reacts with p-tert-butyl toluene to form the desired compound.

The formation of the preferred sodium or potassium phenyl may be effected in a reaction-inert organic solvent, but it is most convenient to prepare the compound in excess p-tert-butyl toluene. This compound thus serves as both reactant and solvent. It is also convenient to use metallic sodium or potassium with a very high surface area so as to attain a suitable rate of reaction. This is accomplished in the usual manner by forming sodium or potassium sand by rapidly stirring the molten metal in a liquid and allowing the mixture to cool. The use of the reactant p-tert-butyl toluene as the liquid is especially advantageous since the metal may be used exactly as it is formed in the liquid, thus avoiding possible contamination by impurities.

The metallic phenyl compound is formed by adding a halobenzene to the mixture of p-tert-butyl toluene and metal formed as above while maintaining the temperature at from about 30° C. to about 40° C. Chlorobenzene is preferred, although both bromobenzene and iodobenzene are suitable. Some cooling may be necessary since the reaction is exothermic. After all of the chlorobenzene has been added, the temperature is raised to from about 90° C. to about 120° C. for from about 4 to about 8 hours. These temperature and time ranges may be varied within rather wide limits without affecting the final yield. However, the ranges given are consistent with a reasonably rapid rate of reaction at convenient temperatures.

Since the p-tert-butyl-toluene functions as both solvent and reactant, it is present in excess. For best yields, with minimum production of by-products the alkali metal and halobenzene should be present in approximately equivalent amounts. A slight excess of metal, e.g., up to about a 5% excess is not detrimental.

Reaction inert solvents useful for the above described reaction include aliphatic and aromatic hydrocarbon solvents free of halogens and labile hydrogen atoms which would react with the alkali metal. Preferably they should not boil below the reaction temperature under standard pressure. However, solvents such as benzene could be utilized under pressure. Other suitable solvents include n-octane and isooctane, for example.

A particular advantage of our process is that the α-p-tert-butyl benzyl alkali metal need not be isolated. The next step of the process can be carried out by simply adding the methallyl halide to the mixture resulting from the above described reaction while maintaining the reaction temperature at from about 15°C. to about 50° C., preferably from 35° C. to 40° C. A reaction-inert organic solvent may be used, but it is not necessary to do so. If a solvent is used, the preferred solvent is p-tert-butyl toluene, the advantage of this solvent being that no additional substance is added to the reaction mixture.

Methallyl chloride is the preferred reagent, although both the bromide and iodide are also suitable.

The reaction time is not critical. However, for best yields we prefer to continue the reaction with stirring for from 1 to 4 hours after all of the methallyl halide has been added.

Also for best yields we prefer to use an excess of methallyl halide based on the amount of halobenzene initially employed. It is not necessary to do so, however, since some product is formed no matter how little methallyl halide is added to the reaction mixture. Molar excesses of from about 25% to about 50% lead to good yields without unnecessarily increasing the expense of the process.

The product 2-methyl-4-(p-tert-butyl-phenyl)-but-1-ene may be isolated in any convenient manner. For example, the reaction mixture may be added to a large excess of a water-methanol-ice mixture and the product isolated by separating and distilling the resulting organic layer. The excess p-tert-butyl toluene or other solvent is preferably removed by distillation at reduced pressure, leaving the desired product as a residue. The product may be purified by distillation if desired.

The reaction-inert organic solvents which may be used for the reaction with methallyl halide are the same as utilized for the preparation of the alkali metal α-p-tert-butyl benzyl compound.

Cyclization of the 2-methyl-4-(p-tert-butyl-phenyl)-but-1-ene to form the desired 6-tert-butyl-1,1-dimethyl indane may be effected using cyclizing agents such as phosphoric, polyphosphoric or sulfuric acid. The preferred reagent is 75–95% sulfuric acid.

In a preferred modification, the product of the foregoing reaction is added to 85% sulfuric acid at a rate consistent with maintaining the reaction temperature at from about 5° C. to about 15° C. with cooling if necessary. The time of reaction is not critical, but the best yields are obtained if the reaction mixture is stirred for an additional 2 to 6 hours after all of the reactant is added.

The amount of cyclizing agent is not critical. Theoretically only one molecule of sulfuric acid or other catalyst would be sufficient to effect cyclization of all of the but-1-ene compound. However, as a practical matter we prefer to use at least equal weights of sulfuric acid and the but-1-ene compound. As much as a 100% weight excess of concentrated sulfuric acid may be utilized with good results.

The product may be isolated in any convenient manner. If sulfuric acid is used, it may be isolated by washing the reaction mass with saturated sodium chloride aqueous solution followed by 10% sodium carbonate aqueous solution whereupon the product separates as an oily layer which may be purified by distillation.

The following are examples of the manner in which we now prefer to practice the processes. It is understood that the invention is not to be considered as restricted thereto except as indicated in the appended claims.

EXAMPLE 1 p-t-Butyl benzyl sodium

In a dry system consisting of a three-liter flask fitted with internally venting dropping funnel, thermometer, bulk glass condenser, and high-speed stirrer, is placed 1,000 cc. of dry t-butyl-toluene and 108 g. of sodium. The apparatus is thoroughly flushed with dry nitrogen. The mixture is heated to 110° C. and upon the complete melting of the sodium, high-speed stirring is initiated and maintained for five to ten minutes. The sodium-sand formed is allowed to cool to room temperature without agitation. To the stirred sodium-sand–t-butyl-toluene mixture is added carefully 45 g. (0.40 mole) of chlorobenzene and 45 g. of t-butyl-toluene. The reaction forming sodium phenyl commences upon nearness of completion of this addition. The exotherm is clearly indicative of the reaction starting and the temperature is maintained from 30 to 40° C. throughout the reaction. A solution of 179 g. (1.60 moles) of chlorobenzene and 265 g. of t-butyl-toluene is then added as quickly as is consistent with maintaining the 40° C. maximum, which takes about one and a half to three hours. The entire mass is heated to 110° C. and maintained at 110° C. for six hours to form the desired product.

EXAMPLE 2

2-methyl-4-(p-t-butyl-phenyl)-but-1-ene

To the para-tert-butyl-sodium in tert-butyl-toluene, prepared in Example 1, is added drop-wise 180 g. of methallyl chloride in 200 cc. of t-butyl-toluene. The temperature is maintained at 35 to 40° C. The stirring is continued for two hours after the last drop is added. The mass is then poured into about 1,000 g. of ice and 200 to 300 cc. of methanol. The decomposition is clean and the separation of water-oil (upper) layer is clean. The t-butyl-toluene is then removed from the oil layer using normal distillation apparatus at 49°/0.3 mm. of Hg, leaving approximately 310 g. of the desired compound. Purification is effected by distillation through an 8" protruded packed column to provide a compound having the following characteristics:

Boiling point _ 79–82° C./0.3 mm. of Hg (vapor temp.).
$n_D^{20}$ _____ 1.5022.
Weight _____ 257 g.
Yield _____ 63.5% of theory.

EXAMPLE 3

6-t-butyl-1,1-dimethyl indane

In a stirred reaction flask fitted with a dropping funnel, condenser and thermometer, 257 g. of 2-methyl-4-(p-tert-butyl-phenyl)-but-1-ene is added drop-wise over a four hour period to 370 g. of 84% sulfuric acid. The temperature is maintained at 8° C. throughout the addition. The mass is stirred for two hours; washed with equal volumes of saturated sodium chloride solution, 10% sodium carbonate solution and finally 10% sodium chloride solution. The organic layer is distilled in a 6" protruded packed column to provide the desired product having a boiling point of 72° C. at .75 mm. of Hg with an $n_D^{20}$ of 1.5080; yield, 187 g., 75% of theory.

The following synthetic procedure illustrates the steps in the process described above.

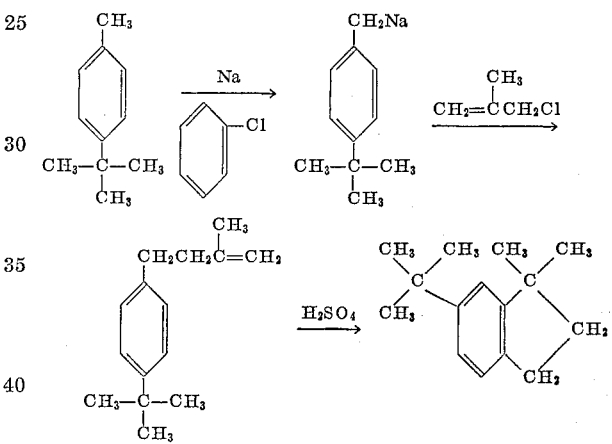

We claim:
1. A compound represented by the formula

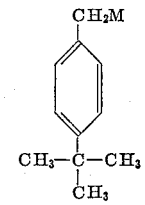

wherein M is an alkali metal.

2. α-p-Tert-butyl benzyl sodium.
3. α-p-Tert-butyl benzyl potassium.
4. 2-methyl-4-(p-tert-butyl-phenyl)-but-1-ene.
5. A process which comprises reacting a compound selected from the group consisting of alkali metal phenyls with p-tert-butyl toluene to produce an alkali metal α-p-tert-butyl benzyl.
6. A process which comprises reacting a compound selected from the group consisting of chlorobenzene, bromobenzene and iodobenzene with up to about a 5% excess of sodium in p-tert-butyl toluene to produce α-p-tert-butyl benzyl sodium.
7. A process which comprises reacting a compound selected from the group consisting of chlorobenzene, bromobenzene and iodobenzene with up to about a 5% excess of potassium in p-tert-butyl toluene to produce α-p-tert-butyl benzyl potassium.
8. A process which comprises reacting a compound selected from the group consisting of alkali metal α-p-tert-butyl benzyls with a compound selected from the group consisting of methallyl chloride, bromide and iodide to produce 2-methyl-4-(p-tert-butyl-phenyl)-but-1-ene.

9. A process which comprises reacting α-p-tert-butyl benzyl sodium with methallyl chloride to produce 2-methyl-4-(p-tert-butyl-phenyl)-but-1-ene.

10. A process which comprises reacting α-p-tert-butyl benzyl potassium with methallyl chloride to produce 2-methyl-4-(p-tert-butyl-phenyl)-but-1-ene.

11. A process which comprises reacting a compound selected from the group consisting of methallyl chloride, bromide and iodide with α-p-tert-butyl benzyl sodium to produce 2-methyl-4-(p-tert-butyl-phenyl)-but-1-ene.

12. A process which comprises reacting a compound selected from the group consisting of methallyl chloride, bromide and iodide with α-p-tert-butyl benzyl potassium to produce 2-methyl-4-(p-tert-butyl-phenyl)-but-1-ene.

13. A process which comprises reacting 2-methyl-4-(p-tert-butyl-phenyl)-but-1-ene with a cyclizing agent to produce 1,1-dimethyl-6-tert-butyl indane.

14. A process which comprises reacting 2-methyl-4-(p-tert-butyl-phenyl)-but-1-ene with from 75% to 95% sulfuric acid to produce 1,1-dimethyl-6-tert-butyl indane.

15. A process for the preparation of 1,1-dimethyl-6-tert-butyl indane which comprises the steps of
(1) reacting a compound selected from the group consisting of alkali metal phenyls with p-tert-butyl toluene to produce an alkali metal α-p-tert-butyl benzyl;
(2) reacting the thus produced compound with a compound selected from the group consisting of methallyl chloride, bromide and iodide to produce 2-methyl-4-(p-tert-butyl-phenyl)-but-1-ene; and
(3) reacting the thus produced compound with a cyclizing agent.

References Cited by the Examiner
UNITED STATES PATENTS 2,889,367  6/1959  Beets et al. _____ 260—668
2,916,529  12/1959  Sanford et al. _____ 260—668

DELBERT E. GANTZ, *Primary Examiner.*

G. E. SCHMITKONS, *Assistant Examiner.*